United States Patent [19]
Curtis

[11] Patent Number: 5,487,849
[45] Date of Patent: Jan. 30, 1996

[54] PULTRUDED COOLING TOWER CONSTRUCTION

[75] Inventor: Harold D. Curtis, Chickasha, Okla.

[73] Assignee: Tower Tech, Inc., Chickasha, Okla.

[21] Appl. No.: 161,069

[22] Filed: Dec. 3, 1993

[51] Int. Cl.$^6$ .................................................. B01F 3/04
[52] U.S. Cl. ...................... 261/30; 261/110; 261/DIG. 11; 261/DIG. 85
[58] Field of Search .............................. 261/30, DIG. 11, 261/DIG. 85, 110, 112.2, 112.1; 55/222, 289

[56] References Cited

U.S. PATENT DOCUMENTS

| | | |
|---|---|---|
| 965,116 | 7/1910 | Morison . |
| 1,287,402 | 12/1918 | Nordberg . |
| 1,383,039 | 6/1921 | Uhde . |
| 1,549,068 | 8/1925 | Dickey . |
| 1,647,281 | 11/1927 | Doyle . |
| 2,250,978 | 7/1941 | Weiland et al. ............................ 62/140 |
| 2,299,920 | 10/1942 | Moore ....................................... 261/30 |
| 2,311,155 | 2/1943 | Carr ........................................... 261/30 |
| 2,445,908 | 7/1948 | DeFlon et al. ............................. 261/23 |
| 2,606,750 | 8/1952 | Jacir .......................................... 261/30 |
| 2,775,310 | 12/1956 | Shelton ..................................... 183/26 |
| 2,780,306 | 2/1957 | Boyle et al. ............................... 183/14 |
| 2,890,870 | 6/1959 | Spiselman ................................. 261/30 |
| 2,915,302 | 12/1959 | Jacir .......................................... 261/30 |
| 3,168,596 | 2/1965 | Jamison .................................... 261/29 |
| 3,214,348 | 10/1965 | Lichtenstein ............................. 202/47 |
| 3,253,819 | 5/1966 | Talbot ....................................... 261/25 |
| 3,262,682 | 7/1966 | Bredberg .................................. 261/29 |
| 3,290,867 | 12/1966 | Jacir ........................................... 55/258 |

(List continued on next page.)

FOREIGN PATENT DOCUMENTS

| | | |
|---|---|---|
| 511792 | 1/1921 | France . |
| 876525 | 11/1942 | France . |
| 1158377 | 6/1958 | France . |
| 389867 | 2/1924 | Germany . |
| 1451155 | 2/1969 | Germany . |
| 2250776 | 4/1974 | Germany . |
| 2522155 | 2/1976 | Germany . |
| 2547718 | 4/1977 | Germany . |
| 3501278 | 7/1985 | Germany . |
| 52-26645 | 2/1977 | Japan . |
| 54-152245 | 11/1979 | Japan . |
| 57-142483 | 3/1982 | Japan . |
| 63-210594 | 8/1988 | Japan .............................. 261/DIG. 11 |
| 15386 | 9/1905 | Norway . |
| 92998 | 5/1982 | U.S.S.R. ........................ 261/DIG. 85 |
| 1511-562-A | 9/1989 | U.S.S.R. . |
| 1502944A | 9/1989 | U.S.S.R. . |
| 711303 | 6/1954 | United Kingdom . |
| 1047454 | 11/1966 | United Kingdom . |
| 1419623 | 12/1975 | United Kingdom . |

OTHER PUBLICATIONS

Paper entitled "Drainage Collection System Shape of The Things To Come?" by Marcel R. Lefevre (1987).
*Power Engineering*, Mar., 1988, article entitled "New drainage system upgrades cooling towers" by Marcel R. Lefevre.
*Power Engineering*, Jul. 1987, article entitled "Technology, education, upgrading boost cooling tower performance" by R. C. Rittenhouse.
Exhibit A—Untitled drawing (Undated but admitted to be prior art).

*Primary Examiner*—Khanh P. Nguyen
*Attorney, Agent, or Firm*—Dougherty, Hessin, Beavers & Gilbert

[57] ABSTRACT

A modular cooling tower apparatus is formed from a plurality of pultruded fiberglass structural members. Four hollow beams are joined together to form a combined liquid basin and support frame structure. A dual-layer drainage collection system rests upon the hollow beams and collects liquid and drains it into the hollow beams. A five-foot-thick body of fill material rests upon the drainage collection system. The overall height of the assembly from the bottom of the basin to the top of the unit is less than eleven feet thus allowing transportation on conventional trucking equipment.

19 Claims, 8 Drawing Sheets

U.S. PATENT DOCUMENTS

| | | | |
|---|---|---|---|
| 3,363,885 | 1/1968 | Meek | 261/30 |
| 3,384,165 | 5/1968 | Mathews | 165/122 |
| 3,608,873 | 9/1971 | Furlong | 261/30 |
| 3,739,556 | 6/1973 | Waters | 55/257 |
| 3,969,447 | 7/1976 | Glitsch et al. | 251/111 |
| 4,044,078 | 8/1977 | Curtis et al. | 261/30 |
| 4,094,937 | 6/1978 | Bodick et al. | 261/111 |
| 4,215,080 | 7/1980 | Ribier et al. | 261/111 |
| 4,218,408 | 8/1980 | Henning et al. | 261/112 |
| 4,267,130 | 5/1981 | Curtis | 261/112 |
| 4,301,097 | 11/1981 | Curtis | 261/109 |
| 4,385,010 | 5/1983 | Bosne | 261/110 |
| 4,416,835 | 11/1983 | Bosne | 261/DIG. 85 |
| 4,416,836 | 11/1983 | Sinek | 261/112 |
| 4,422,983 | 12/1983 | Bardo et al. | 261/DIG. 11 |
| 4,459,244 | 7/1984 | Norbäck | 261/112 |
| 4,521,350 | 6/1985 | Lefevre | 261/111 |
| 4,622,183 | 11/1986 | Sonnenschein et al. | 261/110 |
| 4,637,903 | 1/1987 | Bardo et al. | 261/24 |
| 4,769,186 | 9/1988 | Raybon | 261/DIG. 11 |
| 4,788,013 | 11/1988 | Kinney, Jr. et al. | 261/24 |
| 5,028,357 | 7/1991 | Bardo | 261/111 |
| 5,143,657 | 9/1992 | Curtis | 261/89 |
| 5,152,458 | 10/1992 | Curtis | 239/222.17 |
| 5,227,095 | 7/1993 | Curtis | 261/30 |
| 5,236,625 | 8/1993 | Bardo et al. | 261/DIG. 11 |

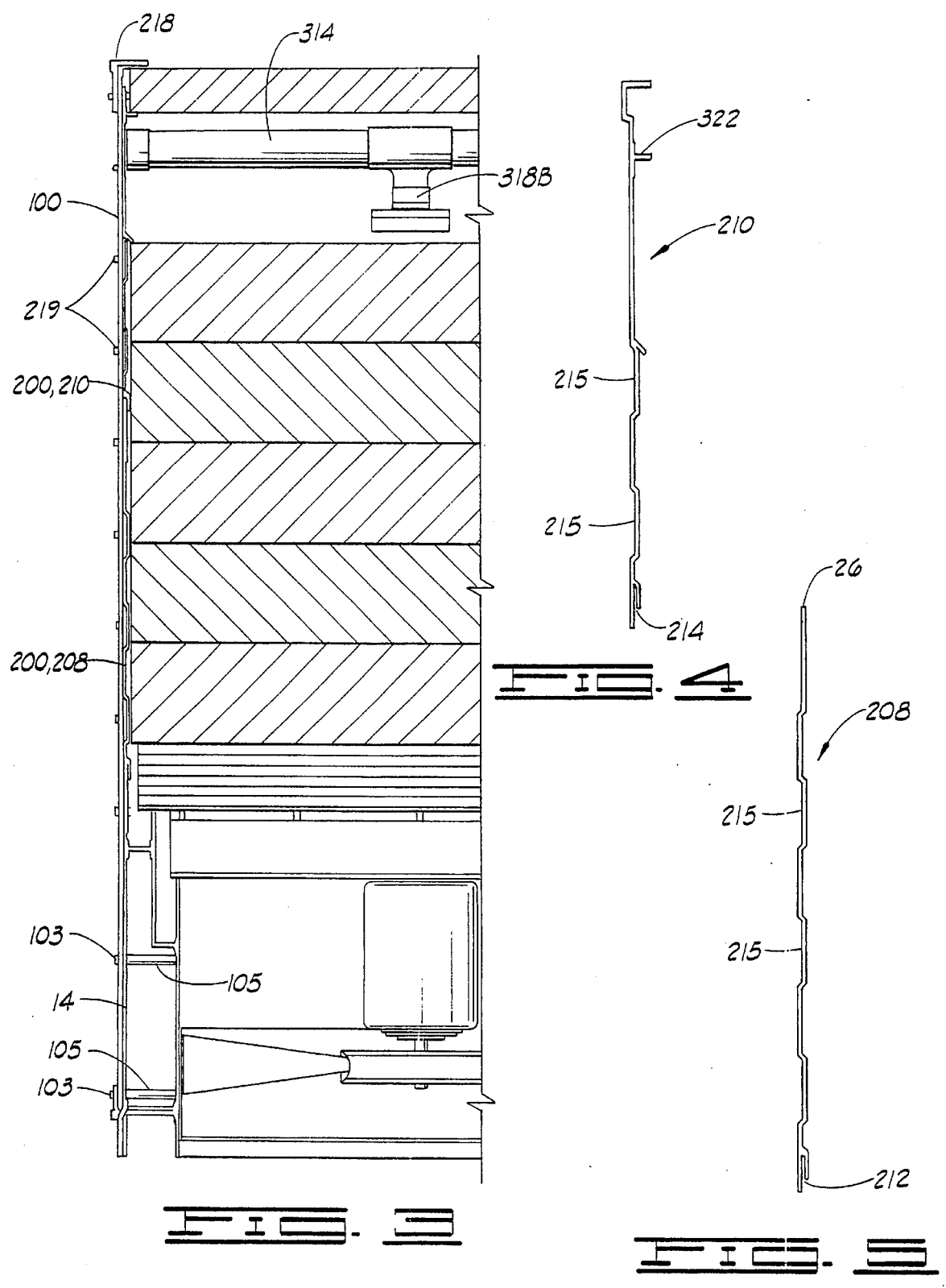

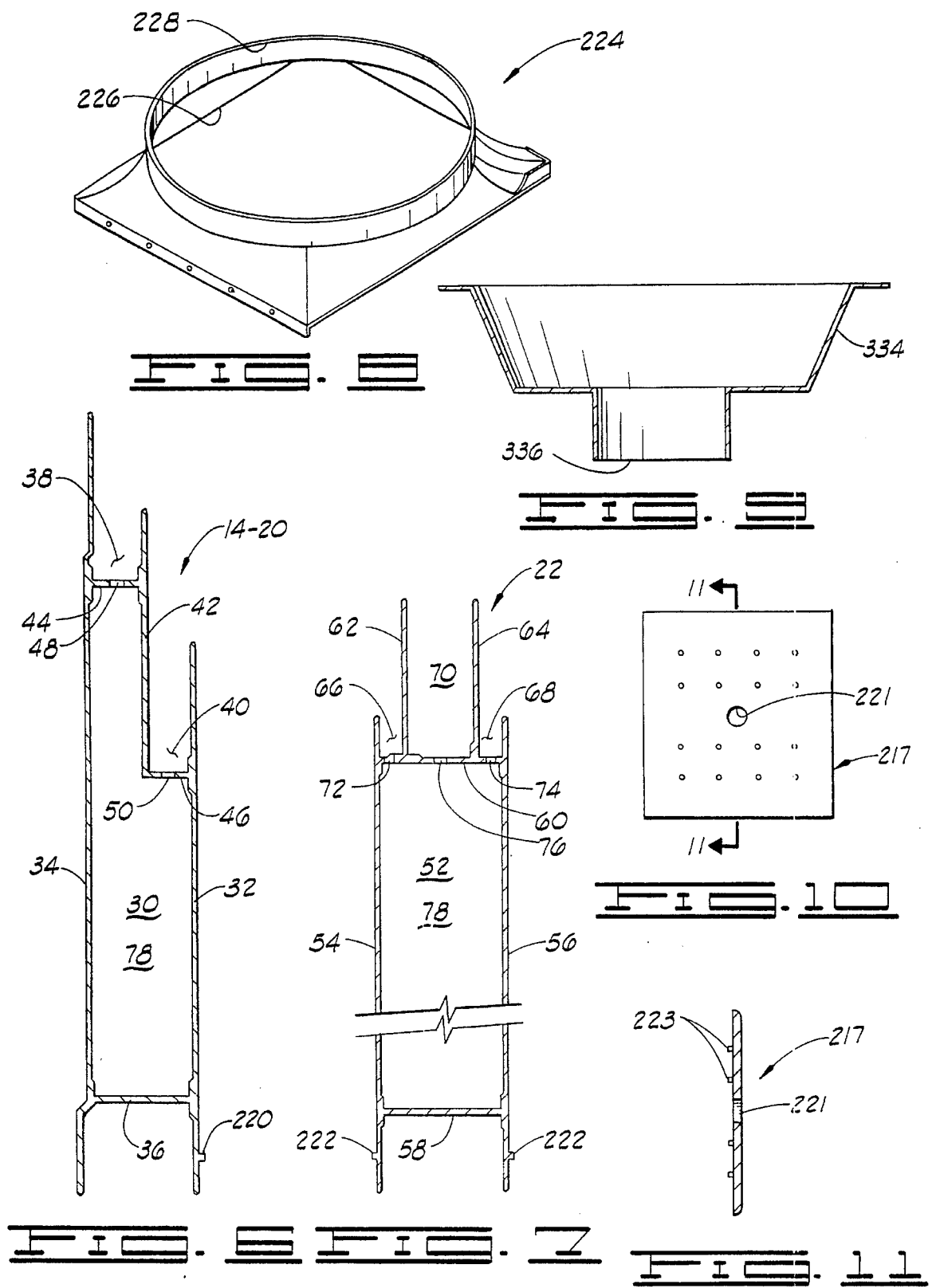

PULTRUDED COOLING TOWER CONSTRUCTION

BACKGROUND OF THE INVENTION

1. Field of the Invention

The present invention relates generally to cooling towers and more particularly, but not by way of limitation, to the manner of construction of modular, compact, highly efficient cooling towers which can be manufactured in a factory environment and then transported to a field site for installation.

2. Description of the Prior Art

One common type of industrial cooling tower is a counterflow tower wherein water falls downward through a fill layer while cooling air moves upward through the fill material. The term "counterflow" refers to the fact that the warm water and cool air are moving in opposite directions.

Counterflow cooling towers traditionally may be of three types, namely induced draft, natural draft, and forced draft.

An induced draft counterflow cooling tower has a fan located on top of the tower which sucks air up through the fill material. Air flows laterally along the ground surface adjacent the tower and once it is under the tower it turns ninety degrees and flows upward through the fill material, with this flow being induced by the fans on top of the tower which suck the air up through the tower. Examples of induced draft counterflow cooling towers are seen in U.S. Pat. Nos. 4,267,130 and 4,301,097, both to Curtis.

U.S. Pat. No. 4,521,350 to Lefevre, shows at FIG. 1 thereof a natural draft counterflow cooling tower. A natural draft cooling tower does not utilize a fan to assist the air flow, but instead relies upon the natural tendency of warmer air to flow upward. The natural draft cooling tower shown in U.S. Pat. No. 4,521,350 is the type commonly referred to as a hyperbolic natural draft cooling tower. The Lefevre patent shows the use of a drainage collection system below the fill material in the natural draft counterflow cooling tower thereshown.

U.S. Pat. Nos. 2,606,750 and 2,915,302 to Jacir show forced draft counterflow water cooling towers. Forced draft towers traditionally have a fan located on the side of the tower which blows air into a plenum chamber on the lower side of the tower. A plurality of vanes are used to turn the air ninety degrees to direct it upward through the tower. As used in the trade, the term "forced draft" is understood to refer to a system like that of Jacir having a fan on the side of the tower blowing into a lower plenum so that the air must then turn ninety degrees to flow upward through the tower.

A second common type of cooling tower is a cross flow tower. Cross flow cooling towers have the warm water falling downward through fill material while cooling air is drawn in horizontally at approximately ninety degrees to the path of the falling water. These cross flow cooling towers are typically induced draft towers which have a plenum chamber and fan located on top of the tower sucking the air up through the tower.

The prior art also includes a cross flow cooling tower having a fan located below the tower for forcing air upward into a central plenum chamber so that the air then turns ninety degrees and flows horizontally out through the fill material which is located around the perimeter of the tower. Such a system has been marketed by the Marley Cooling Tower Company. In that system, there is no fill material located directly above the fan, but rather the fill material is all located around the perimeter of the fan, with the area directly above the fan defining a plenum chamber into which the fan blows.

The prior art also includes many versions of drainage collection systems made up of a series of overlapping sloped collection plates with troughs along their lower edge. Such a system is shown for example in the Lafevre U.S. Pat. No. 4,521,350 patent cited above.

Industrial cooling towers typically are very large structures having lateral dimensions on the order of twenty to one hundred feet and having a height on the order of twenty to thirty feet. Such structures are built at the field site. Typical delay between the time of order and the time of completion of an industrial cooling tower is on the order of one year. The construction of such a tower is a major undertaking.

Although relatively small towers have been built which could be transported to the field site, for example, some rooftop towers used for the mechanical systems of office buildings and the like, until recently there has not been a successful modular cooling tower system whereby individual modules of a size that can be readily transported are fabricated in a factory, and then easily assembled at a field site to provide the large capacity demanded by many industrial water cooling projects. Such a modular system has recently been introduced by the assignee of the present invention and is shown and described in U.S. Pat. No. 5,227,095 to Curtis, the details of which are incorporated herein by reference. The system of the Curtis U.S. Pat. No. '095 patent has the fan located below the fill for forcing air directly upward through the fill; this may be referred to as a direct forced draft counterflow cooling tower. Applicant hereby acknowledges that structures substantially like those shown in the Curtis U.S. Pat. No. '095 patent have been on sale for more than one year prior to the filing of the present application, and thus the subject matter described in the Curtis U.S. Pat. No. '095 patent is prior art to the present application.

SUMMARY OF THE INVENTION

The present invention provides several closely related improvements in the construction of direct forced draft counterflow cooling towers like that shown in Curtis U.S. Pat. No. 5,227,095.

A first area of improvement involves the use of pultruded fiberglass sections for construction of the cooling tower thus eliminating most hand layup operations and greatly reducing the cost of construction of the towers. An assembly of pultruded structural members provides a combined structural support frame and water-holding basin. Associated pultruded wall panels and corner columns are assembled with the support frame sections.

Second, an improved drainage collection system includes two layers of drainage collection plates thus effectively eliminating any overspray from reaching the fans located therebelow thus eliminating problems of icing and the like during winter months.

Third, the redesigned support frame and drainage collection system are sufficiently compact that a full five feet of fill material can be provided thereabove while still maintaining the overall height of the module at no greater than eleven feet so that it may be readily transported on available trucking equipment.

The cooling tower includes a combined basin and support frame assembly including four hollow outer beams. The beams are structurally connected together at their ends to form a four-sided rectangular supporting frame. The beams each have an enclosed interior. The interiors are communicated together to define a basin for collecting liquid. The assembly has at least one basin inlet defined therein. The beams define a generally rectangular plenum space therebetween laterally surrounded by the four beams.

Four walls extend vertically upward from and are supported by the four beams. The walls are preferably formed from pultruded sections.

Preferably, the supporting frame assembly includes at least one intermediate beam which divides the plenum space into first and second plenum space portions.

Two air supply ducts extend upward partially into each of the plenum space portions. Each air supply duct has an air intake opening defined in the bottom thereof and an air discharge outlet opening into the plenum space. Four vertical axis fans are located in the supply ducts.

Each of the four outer beams and the intermediate fifth beam has upper and lower gutters defined on the top thereof. The upper gutters are located laterally outward from the lower gutters.

A dual layer drainage collection system is supported upon the support frame. An upper layer of parallel elongated collection plates is supported from the upper gutters of the beams. A lower layer of parallel elongated collection plates is supported from the lower gutters of the beams.

A body of fill material preferably at least five feet thick is located directly above and supported on the upper layer of drainage collection plates.

A liquid distribution system is located above the body of fill material. A drift eliminator is located above the liquid distribution system.

The entire module has a height from the bottom of the basin to the top of the walls of no greater than eleven feet so that it may be readily transported by available trucking.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is an enlarged view of the left-hand side of FIG. 2 with the supporting framework below the module being eliminated.

FIG. 4 is an enlarged sectioned view of the upper extruded wall panel.

FIG. 5 is an enlarged sectioned view of the intermediate extruded wall panel.

FIG. 6 is an elevation sectioned view of one of the four outer beams.

FIG. 7 is an elevation sectioned view of the intermediate fifth beam.

FIG. 8 is an isometric view of one of the air ducts.

FIG. 9 is a sectioned view of the basin outlet sump.

FIG. 10 is an elevation view of a wall insert used to assemble the wall panels with the corner columns.

FIG. 11 is a sectioned view of the wall insert of FIG. 10, taken along line 11—11 of FIG. 10.

DETAILED DESCRIPTION OF THE PREFERRED EMBODIMENTS

Figure 1:
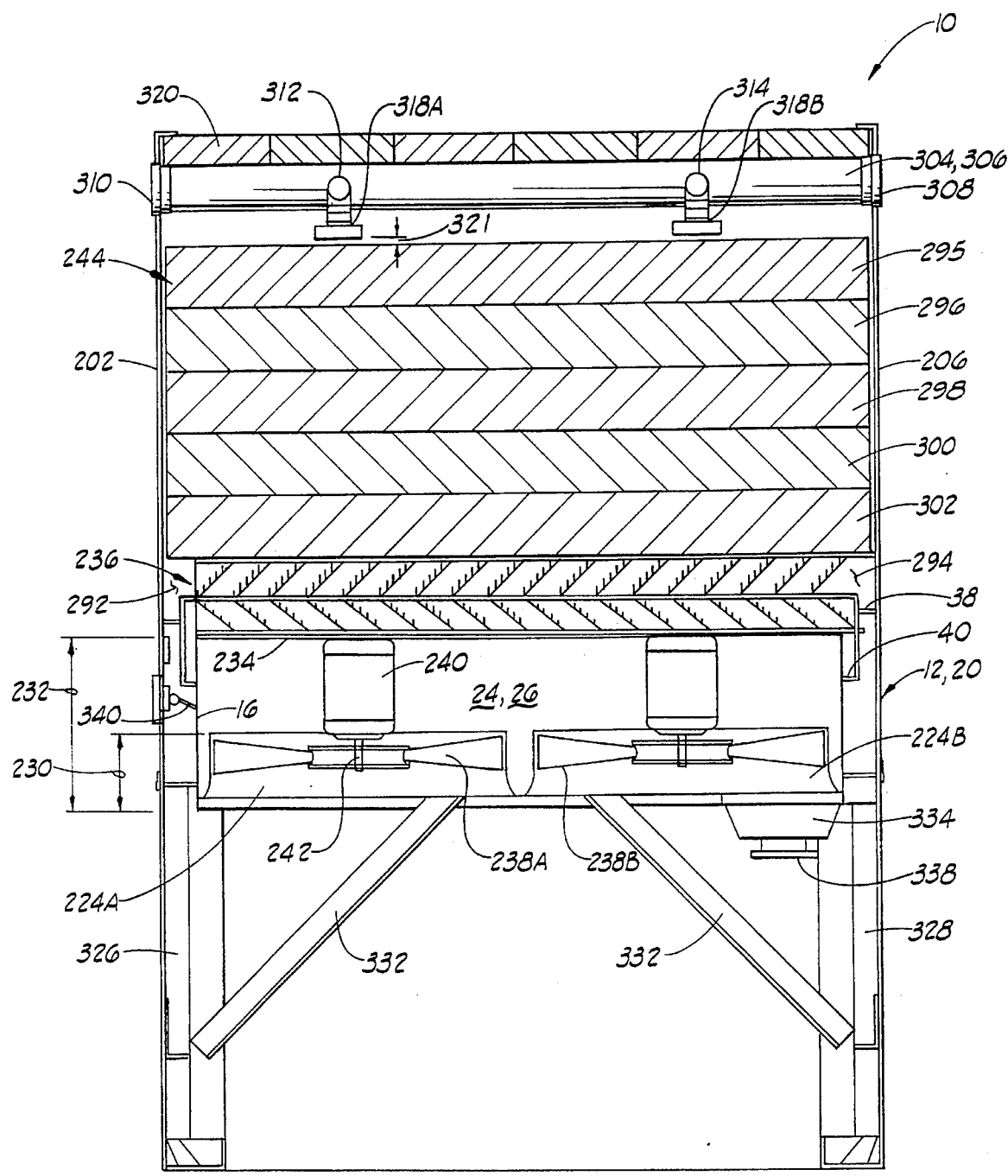
FIG. 1 is an elevation, sectioned, partly schematic view of a single cooling tower module installed in the field on four supporting legs.
Figure 2:
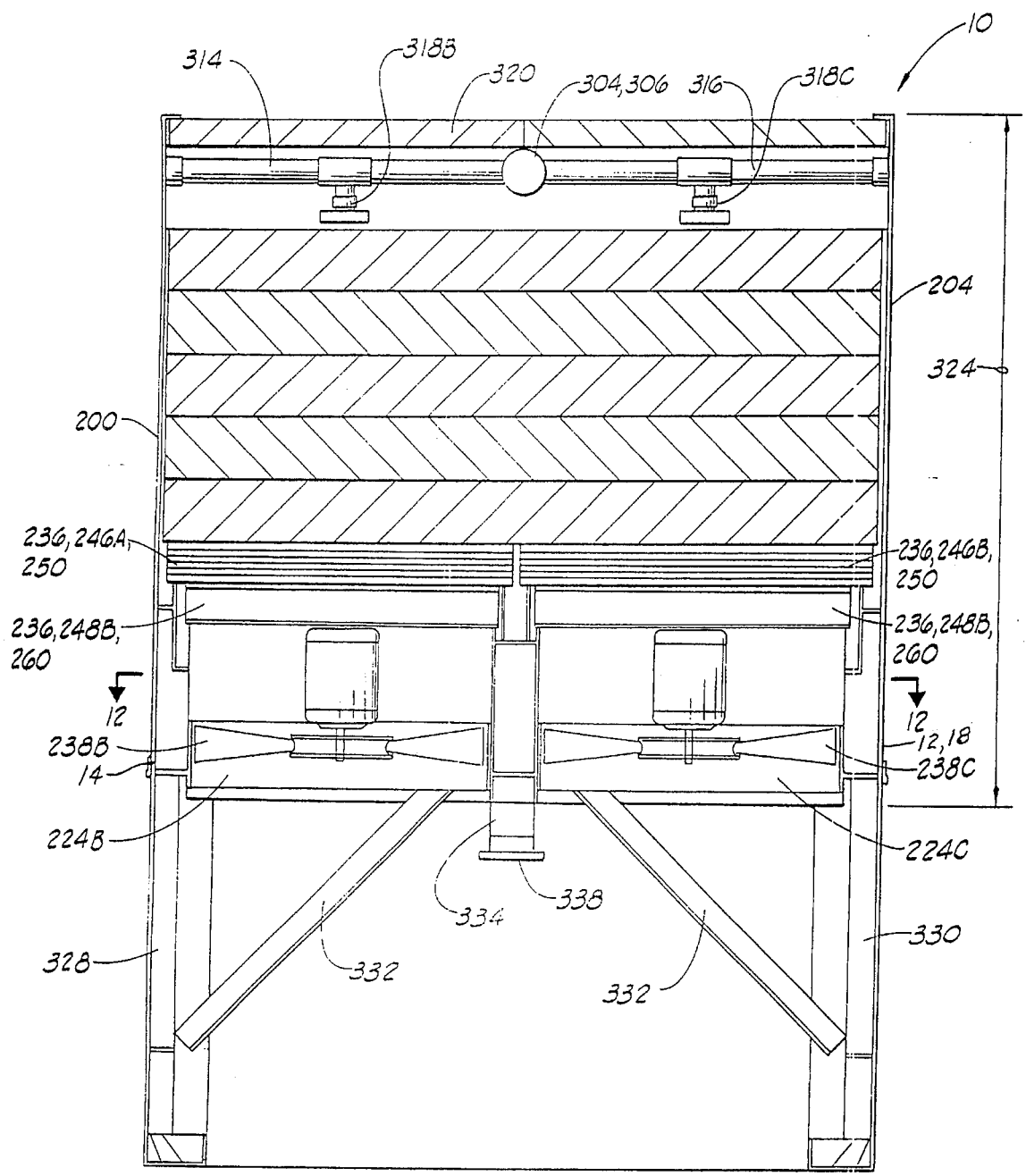
FIG. 2 is a view similar to FIG. 1 oriented at 90° thereto.

Referring now to the drawings and particularly to FIGS. 1 and 2, a cooling tower is shown and generally designated by the numeral 10.

Figure 12:
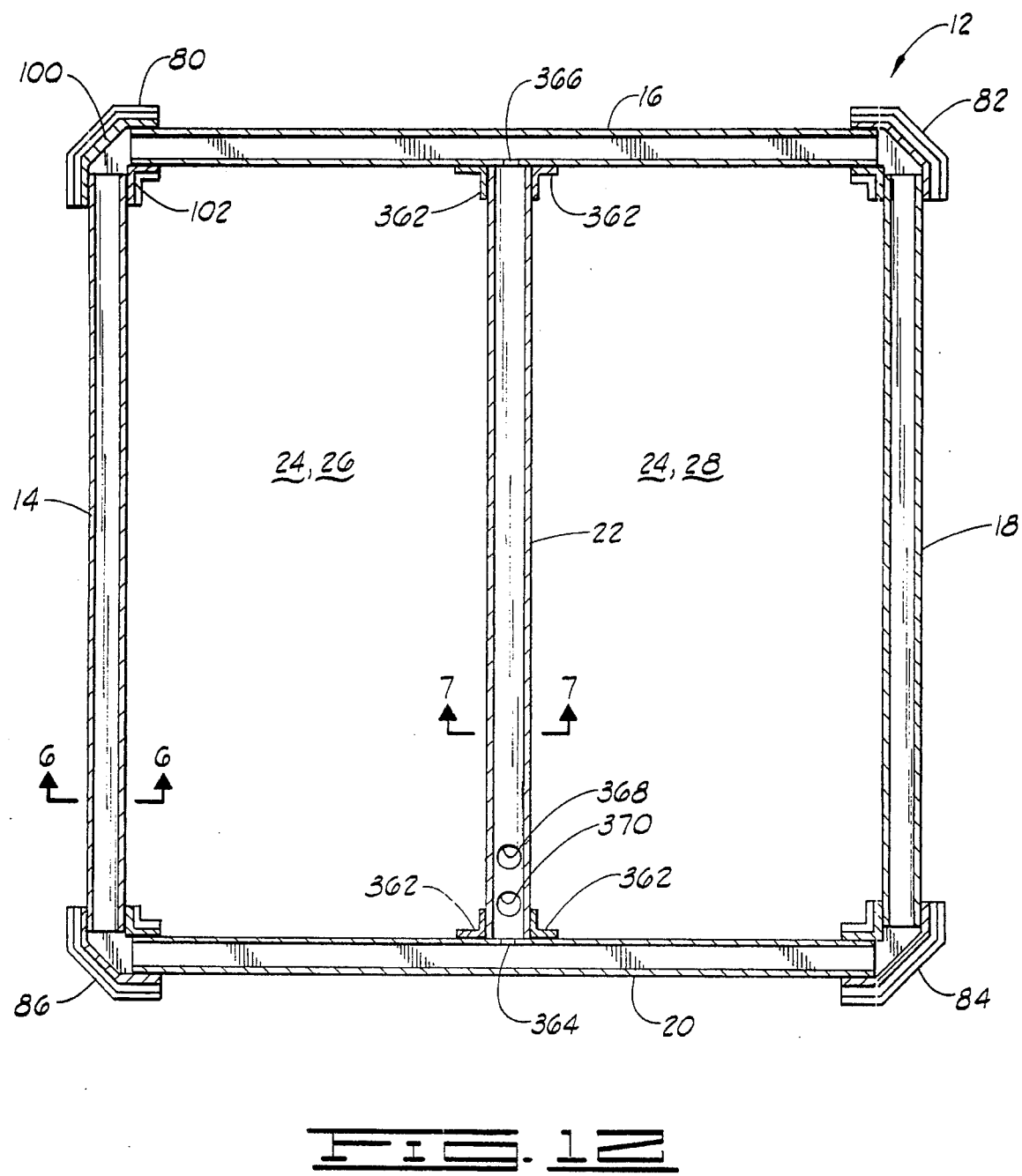
FIG. 12 is a sectioned plan view of the assembled basin support framework taken along line 12—12 of FIG. 2.

The cooling tower 10 includes a combined basin and supporting framework assembly 12, the general layout of which is best seen in FIG. 12.

The assembly 12 includes four hollow outer beams 14, 16, and 20 which are structurally connected together at their ends to form a four-sided, generally rectangular-shaped supporting frame as best seen in FIG. 12. Preferably the assembly 12 also includes an intermediate fifth hollow beam 22 spanning between intermediate points of beams 16 and 20 and oriented generally parallel to beams 14 and 18.

The four outer beams 14, 16, 18 and 20 define a generally rectangular plenum space 24 which is laterally surrounded by beams 14, 16, 18 and 20. The fifth beam 22 divides the plenum space 24 into first and second plenum space parts 26 and 28.

The construction of the beams 14–22 is best shown in the cross-sectional views of FIGS. 6 and 7 which are taken along lines 6—6 and 7—7 of FIG. 12. FIG. 6 illustrates the typical cross section of outer beams 14–20 and FIG. 7 illustrates the typical cross section of intermediate fifth beam 22.

Each of the beams 14–22 are pultruded fiberglass structural members. Thus, each beam has a substantially uniform cross-sectional shape along its length. The four outer beams 14–20 all have substantially identical cross-sectional shapes as seen in FIG. 6. Fifth beam 22 has a different cross-sectional shape as shown in FIG. 7.

The outer beams 14–20 each include a generally enclosed interior 30 defined between inner beam wall 32, outer beam wall 34 and floor 36. The top of the enclosed interior 30 is closed by an upper gutter 38 and a lower gutter 40. The gutters 38 and 40 are formed in part by outer and inner beam walls 34 and 32, respectively. Also, an intermediate beam wall 42 and gutter bottoms 44 and 46 are part of the pultruded cross section and serve to complete the definition of gutters 38 and 40. Gutters 38 and 40 can be collectively referred to as a gutter means of their respective beam.

Spaced along the floor 44 of upper gutter 38 are a plurality of basin inlet openings 48. Similarly, there are a plurality of basin inlet openings 50 defined in the lower gutter 40 to communicate it with the interior 30.

The fifth beam member 22 includes a hollow interior 52 defined between first and second beam walls 54 and 56, beam bottom 58, and beam top 60. Vertical flanges 62 and 64 extend upward from beam top 60 to define first and second intermediate lower gutters 66 and 68. A combined intermediate upper gutter 70 is defined between flanges 62 and 64.

The gutters 66, 68 and 70 drain into the hollow interior 52 through openings such as 72, 74 and 76, respectively.

When the beams 14–22 are joined together as shown in FIG. 12, the interiors 30 and 52 are communicated to define a basin 78. The basin 78 is substantially a flow-through conduit which has very low residence time for the liquid contained therein and thus there is no substantial settling of solid materials from those liquids. Further, the basin is not exposed to dirt and other trash blowing into it as is the case with conventional open top basins.

Figure 14:
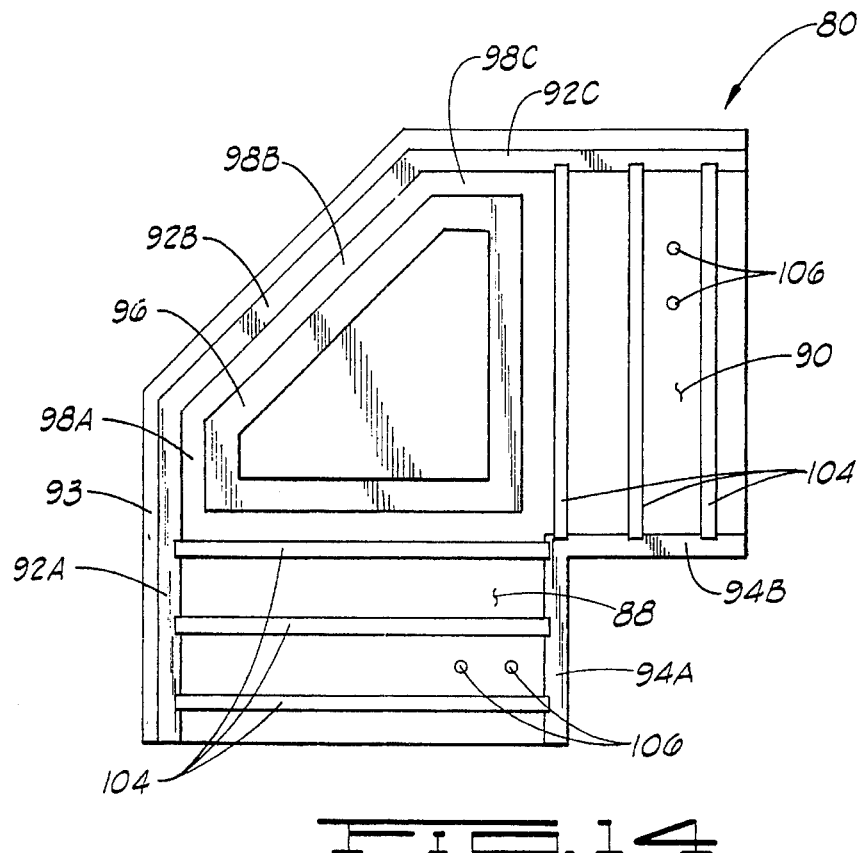
FIG. 14 is a top view of a corner connector molding used to connect the ends of two adjacent outer beams.
Figure 15:
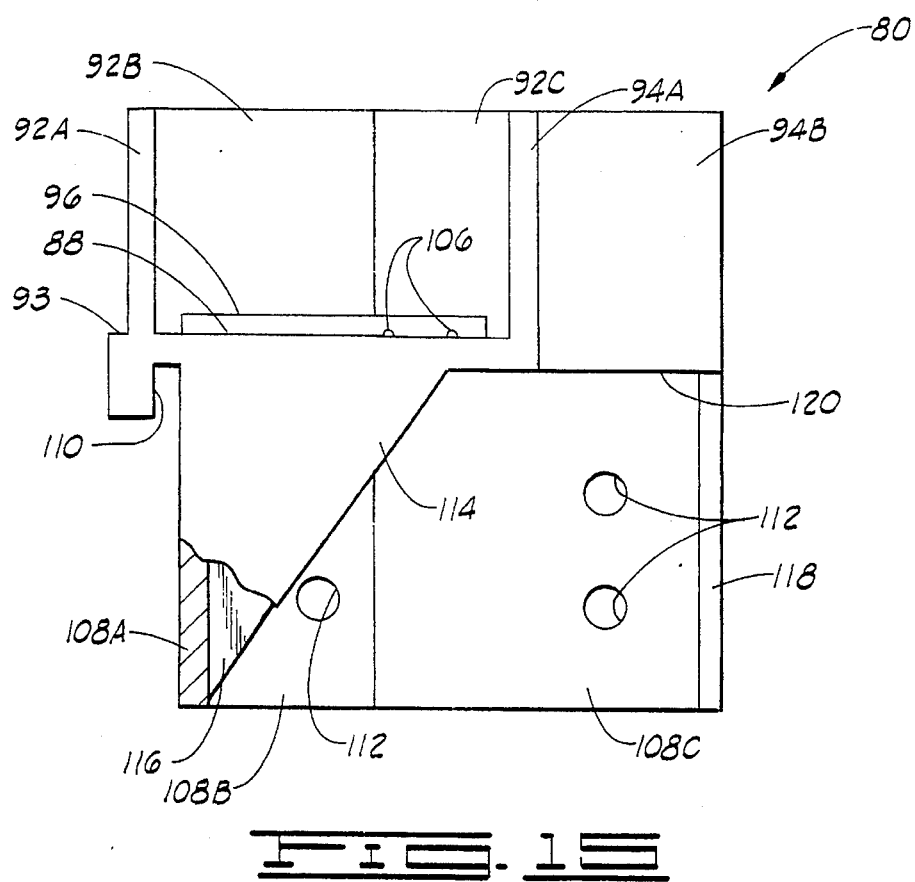
FIG. 15 is an elevation view of the corner connector molding of FIG. 14.
Figure 16:
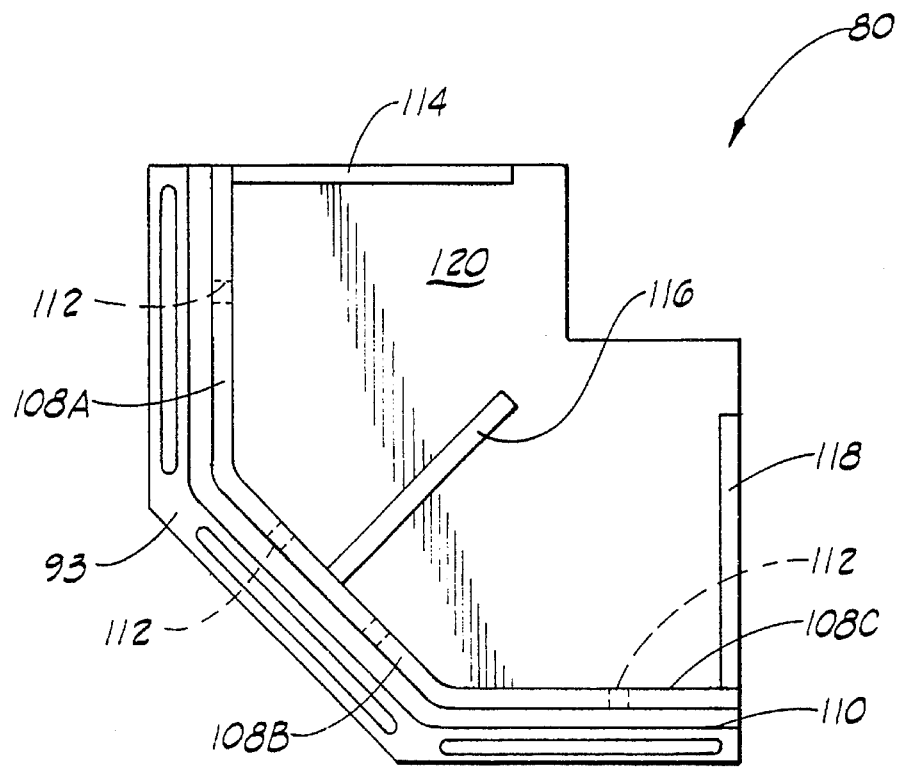
FIG. 16 is a bottom view of the corner connector of FIG. 14.

As is best seen in FIG. 12, the ends of the outer beams are connected together by four corner connector moldings 80, 82, 84 and 86. The details of construction of first corner connector molding 80 are shown in FIGS. 14, 15 and 16. The other corner connector moldings are identical.

FIG. 14 is a top view of the corner connector molding 80. FIG. 15 is a front elevation view of the molding of FIG. 14. FIG. 16 is a bottom view of the molding of FIG. 14.

The molding 80 defines two generally horizontal flat surfaces 88 and 90 upon which the end portions of beams 14 and 16 will rest. A three-sided wall 92 extends upward near the outer perimeter of molding 80 and includes three wall sections 92A, 92B and 92C. A lip 93 extends laterally outward beyond outer wall 92.

An inner upwardly extending wall 94 of molding 80 is an angle-shaped wall and includes wall portions 94A and 94B.

An intermediate shallow raised ridge 96 extends upward from the elevation of horizontal surfaces 88 and 90 and defines part of a three-sided groove 98 between ridge 96 and outer wall 92. The three-sided groove 98 may be described as having three groove portions 98A, 98B and 98C.

As is seen in FIG. 12, the groove 98 receives a three-sided vertical corner frame member 100 therein. The frame member 100 extends vertically upward along the entire height of the walls 200–204 of the cooling tower as can be seen in FIGS. 1 and 2. The frame member 100 is bolted to the three-sided wall 92 with a plurality of bolts (not shown) extending through bolt holes (not shown) in wall segments 92A and 92C.

A vertically extending angle-shaped inside corner member 102 is received inside corner wall 94 as seen in FIG. 12. The end portions of outer beams 14 and 16 are then received closely between the inside corner member 102 and the three-sided corner frame member 100 as seen in FIG. 12. Bolts 103 and spacers 105 are used to bolt the entire corner assembly together as seen in FIG. 3.

The flat surfaces 88 and 90 have a plurality of grout grooves 104 formed therein. The grooves 104 also extend upward into walls 92 and 94 as seen in FIG. 14. Furthermore, the horizontal surfaces 88 and 90 have a plurality of raised bosses or bumps 106 extending upwardly therefrom. Only a few such bosses are shown in the figures. Generally, however, such bosses or other spacing means must be provided between all of the connections of the various structural pieces associated with the corner connector molding 80. The purpose for providing spaces between the various components is to allow room for a sealing grout to be provided therebetween. Such a sealing grout is necessary to provide water-tight connections between these various components. A preferred such sealing grout is a urethane sealant sold under the trade name Vulkem 921 Sealant, available from Mameco International, Inc., of Cleveland, Ohio.

As best seen in FIGS. 15 and 16, the corner connector molding 80 has a downward extending three-sided wall 108 having three wall sections 108A, 108B and 108C which extends downward from the floor which defines the horizontal surfaces 88 and 90. Wall 108 is located inward of lip 93 thus defining a three-sided groove 110 therein for receiving a three-sided corner supporting column 328 (see FIG. 2) therein. The three-sided corner columns such as 328 are identical in dimensions and construction to the three-sided corner frame members such as 100 which is located immediately thereabove.

The corner support column 328 is bolted to corner connector 80 by a plurality of bolts (not shown) extending through bolt holes such as 112.

Triangular-spaced reinforcing gussets 114, 116 and 118 extend from wall portions 108A, B and C, respectively, up to a bottom surface 120 of the floor which defines horizontal surfaces 88 and 90.

With regard to FIG. 12, the intermediate beam 22 will be attached to mid points of the outer beams 16 and 18 with angle-shaped corner members such as 362 which are bolted thereto with suitable caulking sealant material therebetween. Beam openings such as 364 and 366 will communicate the interiors of intermediate beam 22 with the outer beams 16 and 20.

As best seen in FIGS. 1 and 2, there are four walls 200, 202, 204 and 206 extending upward from support beams 14, 16, 18 and 20, respectively. An enlarged view of wall 200 is shown in FIG. 3. The wall 200 is made up of an intermediate pultruded fiberglass wall panel 208 and an upper pultruded fiberglass wall panel 210, the details of which are best shown in FIGS. 5 and 4, respectively. The intermediate panel 208 has a groove end 212 defined on its lower edge which receives the upper edge of outer beam wall 34 therein to define a tongue and groove connection therebetween.

Upper panel 210 has a groove 214 defined along its lower edge which receives the upper edge or tongue 216 of intermediate panel 208 therein to define a second tongue and groove connection between the intermediate panel 208 and upper panel 210. The lateral edges of the walls 200–206 are joined together by the three-sided corner columns such as 100 previously described with regard to FIG. 12. The upper end of the corner column 100 is finished off by an upper corner cap molding 218.

As is most apparent in FIGS. 4 and 5, the wall panels 208 and 210 have a slightly corrugated shape to increase their structural rigidity and to provide an aesthetically pleasing appearance. The outwardly concave corrugations 215 thus do not fit flush against the inside of corner columns 100. These gaps are filled with insert plates 217 which are shown in FIGS. 10 and 11. Bolts 219 fit through holes 221. Slightly raised bosses 223 aid in holding a caulking material like that previously described in place until it sets to seal between corner column 100 and insert plates 217.

As best seen in FIGS. 6 and 7, the outer beams 14–20 and fifth beam 22 have duct supporting flanges 220 and 222, respectively, defined thereon. These duct supporting flanges support four air supply ducts such as duct 224 shown in FIG. 8 therein. Three of those ducts are visible in FIGS. 1 and 2 and are designated as 224A, B and C. Each duct has a rectangular air intake opening 226 defined in a bottom thereof and a circular air discharge outlet 228 defined in an upper end thereof and opening into the plenum space 24. As best seen in FIG. 1, the ducts 224 extend only partially into the plenum space 24 and preferably extend a first distance 230 which is no greater than one-half a second distance 232 defined from air intake opening 226 to a bottom edge 234 of a drainage collection system generally designated by the numeral 236.

Four vertical axis fans 238 are disposed in the air supply ducts 224. Three of the fans are visible in FIGS. 1 and 2 and are designated by the numerals 238A, B and C.

Each of the fans 238 includes an electric motor 240 having a downwardly directed motor shaft 242 upon which the fan blade is mounted. The motor 240 is mounted on a bracket (not shown) supported from the framework 12. The fans pull ambient air in through the air intake openings 226 and push it out the air discharge outlets 228 into the plenum chamber 24 which allows the upwardly flowing air to spread out and flow through the drainage collection system 236 and subsequently through the body of fill material 244 at a substantially uniform density, and certainly at a more uniform density than would be provided if the air supply ducts 224 extended all the way up to the bottom edge 234 of the drainage collection system 236. That latter arrangement would cause more dense air flow immediately above the ducts and less dense air flow in the interstitial spaces between the circular discharge outlets.

Figure 13:
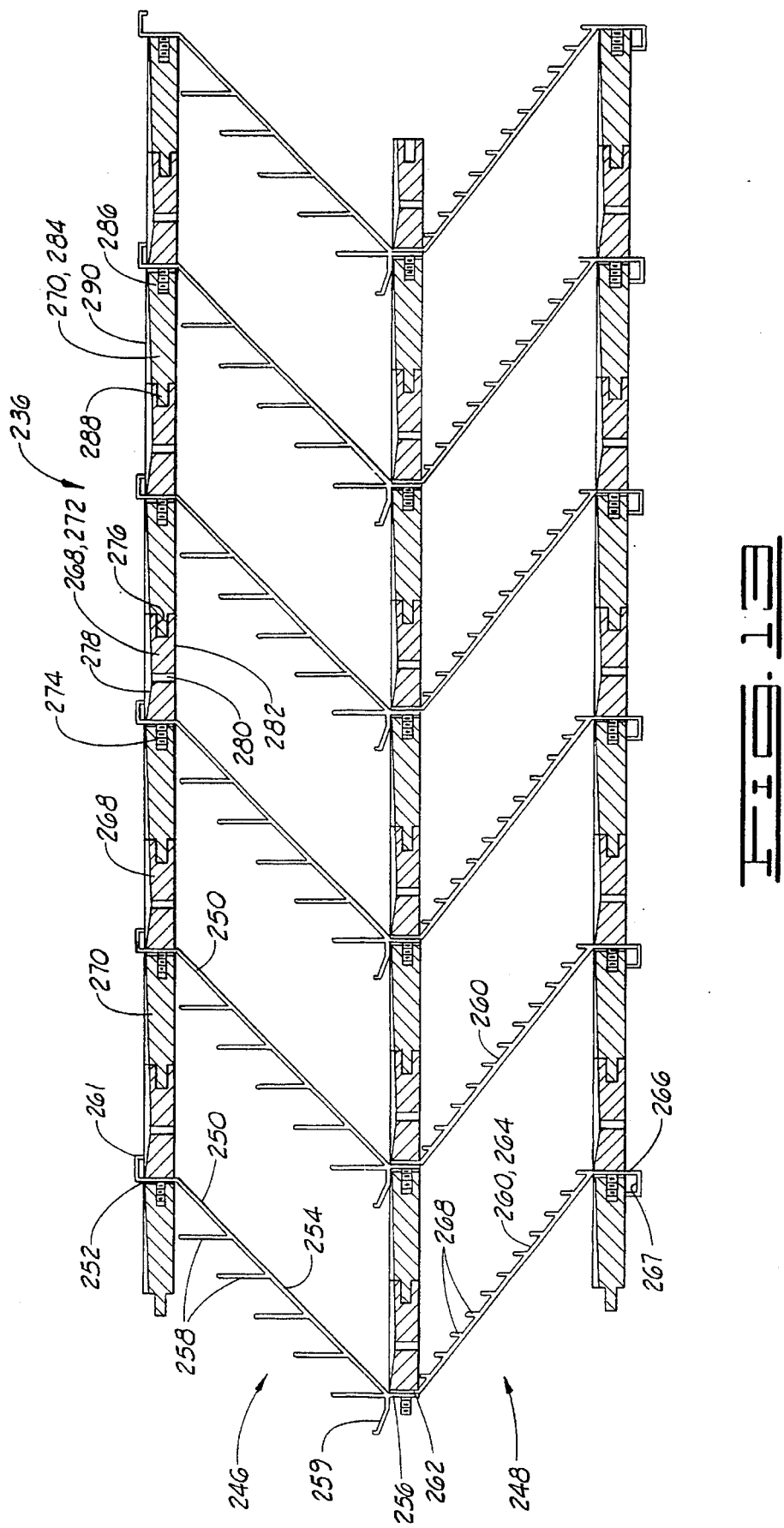
FIG. 13 is an enlarged elevation view similar to that seen in FIG. 1 of a portion of the dual layer drainage collection system.

The drainage collection system 236 is best illustrated in FIG. 13 and includes an upper first layer 246 and a lower second layer 248 of drainage collection plates.

The upper first layer 246 includes a plurality of parallel, elongated collection plates 250. Six such plates are illustrated in FIG. 13. As is apparent in FIG. 1, the entire layer 236 includes many more such plates.

As seen in FIG. 2, each of the upper and lower layers 246 and 248 are divided into two halves, with the drainage plates draining into the upper gutters 38 of outer beams 14 and 18 and the combined upper gutter 70 of intermediate fifth beam 78. The halves of upper layer 246 are designated as 246A and 246B. The halves of lower layer 248 are designated as 248A and 248B.

Each of the collection plates 250 has a length as seen in FIG. 2. The collection plates are sloped and overlap in a direction transverse to that length as is apparent in FIGS. 1 and 13.

Each plate 250 includes an upper vertical flange 252, a sloped portion 254, and a lower vertical flange 256. A plurality of vertical ribs 258 extend up from sloped portion 254 and thus define a plurality of horizontal channels running along the length of the plate 250. An outwardly extending flange 259 defines a lowermost channel of the plate 250. It can be seen that the lowermost channel 259 of each plate 250 underlies the upper flange 252 of the adjacent plate 250 so that all of the liquid falling from the fill material 244 will fall on one of the plates 250. The upper flange 252 includes a lip 261 which prevents water from adhering to and running down the back side of sloped plate portion 254. The outer edge of flange 259 and the upper ends of ribs 258 are aligned so as to provide a minimal restriction against air flow between the back side of each sloped plate portion 254 and the ribs of the upper side of the adjacent plate 250.

The flange 259 is slightly curved and is turned up at its outer edge so as to minimize the interruption of the air flow therearound.

The vast majority of the liquid falling from the body of fill material 244 will be collected on the collection plates 250 of the first layer 246 and will then run transversely along the length of those plates and drain into the upper gutters 38 of outer beams 14 and 18 and the combined upper gutter 70 of fifth beam 22 as is best illustrated in FIG. 2. Any splash or overspray of liquid which is not trapped by the first layer 246 of plates will then fall upon and be collected by the second layer 248 of collection plates.

The second layer 248 includes a plurality of collection plates 260. Each of the plates 260 includes a vertical upper flange 262, a sloped portion 264, and a vertical lower flange 266. The lower flange 266 includes an upturned channel 267 for collecting any water which might run down the back side of sloped portion 264. A plurality of vertical upwardly extending ribs 268 are defined on the sloped portion 264 for collecting water and channeling it to the outer ends of the plates 260.

It is noted that the ribs 268 have a substantially shorter vertical height than do the ribs 258. This is done for two purposes. First, it will be appreciated that because the upper plates 250 collect the vast majority of the water, those upper plates 250 must have the capacity of channeling away a much larger volume of water than do the lower plates 260. Thus, deeper channels are needed to provide the necessary greater flow rate. On the other hand, it is not desired to have the ribs of either upper or lower plates 250 or 260 any taller than necessary, because they can significantly impede the flow of air upwardly through the drainage collection system 236. Thus, since the lower plates 260 carry much less water, they can have much shorter ribs 268 thus minimizing the resistance to air flow upwardly through the lower layer 248 of collection plates.

As is best seen in FIG. 2, the outer ends of plates 260 rest upon the upper edge of inner beam walls 32 of beams 14 or 18 and the upper edge of walls 54 or 56 of intermediate beam 22 so that they drain into the lower gutters 40 and the lower gutters 66 or 68, respectively. That water will then drain through the basin inlet openings such as 48 and 50 into the basin 78. Water which reaches the ends of gutters 38 and 40 will also fall downwardly through the generally triangular-shaped open corner space between corner frame member 100 and inside supporting angle frame member 102 (see FIG. 12) and fall into the basin 78.

FIG. 13 illustrates the manner in which the drainage collection system 236 is assembled. It is made up of only four different components, namely the upper plates 250, the lower plates 260, and male threaded connectors 268 and female threaded connectors 270. The connectors 268 and 270 can be collectively referred to as a framework 268, 270 for the collector plates.

Each of the male threaded connectors 268 includes a body 272 having a threaded male extension 274 on one end thereof and a non-threaded blind bore 276 on the other end thereof. The upper surface of body 272 has a concave depression 278 therein communicated with a weep hole 280 which extends through to the bottom surface 282.

Each of the female threaded connectors 270 includes a body 284 having a threaded bore 286 in one end thereof and having a smooth, non-threaded pin 288 extending from the other end thereof. The body 284 has a shallow depression 290 in its upper surface which is complementary to and drains onto the depression 278 on the adjacent male threaded connector 268.

As is apparent in FIG. 2, the lengths of the plates 260 of the lower layer 248 are shorter than the lengths of the plates 250 of the upper layer 246.

As is apparent in FIGS. 1 and 13, the collection plates 260 of the second layer 248 are sloped oppositely from the collection plates 250 of the upper layer 246. That is, the upper plates 250 can be said to have a positive slope and the lower plates 260 can be said to have a negative slope as viewed in FIG. 13.

A lower edge of each of the collection plates 250 of upper layer 246, as defined by its lower vertical flange 256 coincides with and overlaps with the upper edge of each of the collection plates 260 of lower layer 248 as defined by its upper vertical flange 262. The flanges 256 and 262 have aligned bolt holes therein through which the threaded pin 274 of one of the male connector pieces 268 extends. That threaded pin 274 is then made up with a threaded bore 286 of the adjacent female connector 270.

Similarly, as viewed in FIG. 13, a male connector 268 and female connector 270 are made up through bolt holes in the upper vertical flanges 252 of upper plates 250 and the lower vertical flanges 266 of lower plates 260.

It will be apparent in viewing FIG. 13 that the drainage collection system 236 can be described as being made up from a plurality of herringbone-shaped segments, each of which includes one of the upper collection plates 250 and one of the lower collection plates 260 with three pairs of the male and female connectors 268 and 270. This provides a segment which has non-threaded male pins 288 on its left side and non-threaded blind bores 276 on its right side so that the segments may be easily fitted together by pushing the pins 288 into the bores 276 of the adjacent herringbone segment. Thus the overall arrangement of the collection plates of drainage collection system 236 can be described as forming a herringbone pattern. The herringbone-shaped segments can be described as having a detachable push fit assembly therebetween which allows for easy assembly or removal.

It is noted that with the configuration of FIG. 13, any liquid which falls upon the upper surface of one of the plates 250 and splashes out will be directed toward the channels of the lower plate 260 located to the left thereof as seen in FIG. 13.

It has been determined that using the herringbone-shaped arrangement of upper and lower collection plates provides a superior water collecting capability substantially preventing any moisture from reaching the fans therebelow. It has been found to work superior to other possible arrangements of two layers of plates. This arrangement provides superior water collection and provides an acceptably low flow impedance to the air moving upwardly therethrough, both of which are critical to having an efficiently and properly operating tower.

The purpose of the depressions or concavities 278 and 290 and weep holes 280 is to allow any moisture which falls on top of the connector pieces 268 and 270 to drain through the weep holes 280 to be collected on the collection plates lying therebelow. It will be appreciated that the weep holes in the lower row of connector pieces attaching the lower flanges 266 of lower collection plates 260 are essentially non-functional since no liquid of consequence will reach those pieces. Those lower connectors are formed with the weep holes simply to avoid the necessity of molding more than the two different types of connector pieces.

As is apparent in FIG. 1, there are outside air flow spaces 292 and 294 defined between the drainage collection system 236 and the walls 202 and 206 which allow some of the air from plenum chamber 24 to flow through those spaces 292 and 294. This eliminates air voids adjacent walls 202 and 206.

The gutters 38 and 40 of beams 16 and 20 as seen in FIG. 1 do not collect water directly from the drainage collection system, but instead they catch wall water running down walls 202 and 206 and water which falls downward through the peripheral air spaces 292 and 294.

The body of fill material 244 preferably is formed from five layers 295, 296, 298, 300 and 302. The fill material is a commercially available, corrugated plastic fill material which preferably is provided in strips one foot wide by one foot thick having a width such that each strip will snugly fit between walls 202 and 206.

A liquid distribution system 304 is located immediately above the body of fill material 244. Distribution system 304 includes a main header 306 which spans between and is supported from walls 202 and 206. Header 306 has a bolted inlet flange 308 on one end thereof and a bolted blind flange 310 on the other end thereof. Four lateral pipes such as 312, 314 and 316 extend from header 306. There are four such laterals, each of which carries a low profile. rotating nozzle 318, three of which are shown and designated as 318A, B and C.

The nozzles 318 have a free-fall height 321 of liquid spray from the nozzle to the top of the fill material 244 of only a few inches. In any event, nozzles should be utilized having such a free-fall height of substantially less than one foot in order to achieve the compactness of the module 10 which is desired. The nozzles 318 preferably are constructed in accordance with the teachings of Curtis U.S. Pat. No. 5,143,657 for FLUID DISTRIBUTOR and Curtis U.S. Pat. No. 5,152,148 for AUTOMATICALLY ADJUSTABLE FLUID DISTRIBUTOR, the details of which are incorporated herein by reference.

A drift eliminator 320 is located above the liquid distribution system and preferably is supported from the central header 306 and from inward extending flanges 322 (see FIG. 4) defined on the upper wall segments 210 of the four walls.

A cooling tower constructed in accordance with the present invention can provide an overall height 324 (see FIG. 2) from the bottom of the basin to the top of the walls of less than eleven feet while still providing five full feet of fill material and providing a double layer of collection plates. Thus, a very high capacity unit is provided in a very efficiently used compact space having a height 324 which allows it to be pulled on readily available trucking systems of standard height.

As seen in FIGS. 1 and 2, the module 10 is supported by four legs or corner columns such as 326, 328 and 330 located at the corners of the framework 12. The corner columns are three sided as previously described. The corner columns are braced to the outer beam spanning therebetween by angle-shaped structural brace members 332.

In operation, the liquid which is to be cooled is distributed across the body of fill material 244 with liquid distribution system 304. That liquid trickles downward through the corrugated layers of fill material and then is collected primarily in the upper layer 246 of collection plates with any overspray being caught with the lower layer 248 of collection plates. That liquid then drains into the basin 78 through the gutters 38, 40, 66, 68 and 70. One of the primary problems which must be overcome when utilizing fans located below the fill material is to completely eliminate any overspray from reaching the fans. Otherwise, severe icing could occur during wintertime operating conditions. This problem is solved by the use of the dual-layer drainage collection system 236.

The fifth beam 22 has a basin outlet sump 334 attached thereto which is best seen in FIG. 9. A basin outlet 336 has a flange 338 mounted thereon so that an outlet line can be bolted thereto. The sump 334 is communicated with the interior of intermediate beam 322 through openings such as 368 and 370.

A liquid level controller 340 (see FIG. 1) is disposed in the basin 78 for monitoring the level of liquid therein. The controller 340 will be connected to appropriate valves, pumps and the like for controlling the flow of liquid through the cooling tower module 10. The water level will generally be controlled by controller 340 to remain below the gutter bottom 46.

Figure 17:
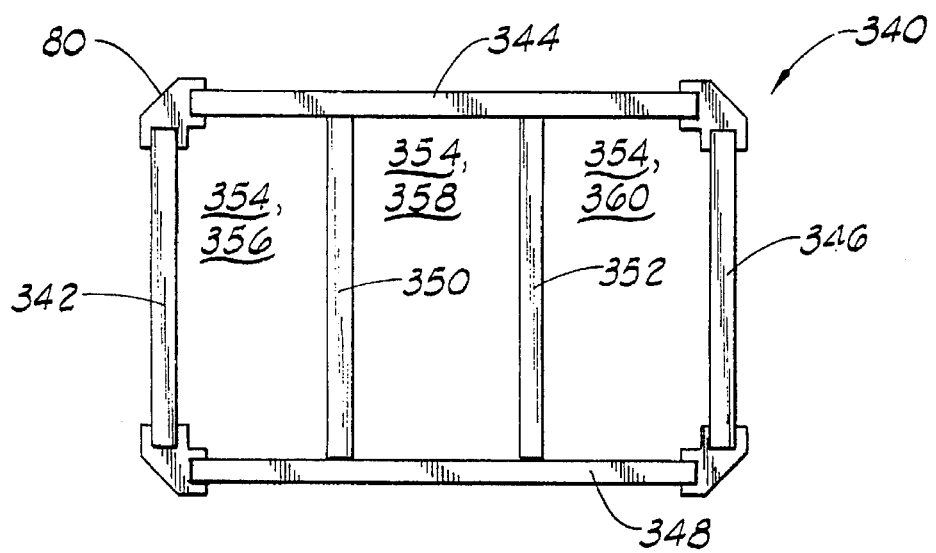
FIG. 17 is a schematic plan view somewhat similar to FIG. 12 of an alternative embodiment of the invention having more than one intermediate beam.

Finally, it is noted that the cooling tower construction of the present invention can be applied to elongated rectangular shapes as shown in FIG. 17 as well as to the generally square shape shown in FIG. 12. For example, if the module represented in FIG. 12 has generally square outer dimensions of approximately twelve feet by twelve feet, that construction can be modified to provide a twelve-foot-by-eighteen-foot or a twelve-foot-by-twenty-four-foot module. FIG. 7 schematically illustrates the combined supporting framework and basin assembly 340 of a twelve-foot-by-eighteen-foot module. The module 340 has four outer beams 342, 344, 346, and 348 all of which have cross sections like that of FIG. 6. Framework 340 includes two intermediate beams 350 and 352 each of which have cross sections like that of FIG. 7. The connections between adjacent outer beams and between outer beams and intermediate beams are identical to those previously described with regard to FIG. 12. The framework shown in FIG. 17 defines a plenum chamber 354 that can be described as made up of three plenum chamber parts 356, 358 and 360. There will be two air ducts and two fans located in each of the plenum space portions 356, 358 and 360.

The use of a twelve-by-eighteen module or twelve-by-twenty-four module reduces the cost of construction and installation as compared to a modular tower of equivalent capacity provided by multiple smaller modules. An additional I-beam cross-sectioned supporting column will be placed under the longer outer beam adjacent the end of each intermediate beam.

Thus it is seen that the apparatus of the present invention readily achieves the ends and advantages mentioned as well as those inherent therein. While certain preferred embodiments of the invention have been illustrated and described for purposes of the present disclosure, numerous changes may be made by those skilled in the art, which changes are encompassed within the scope and spirit of the present invention as defined by the appended claims.

What is claimed is:

1. A cooling tower apparatus, comprising:

a body of fill material;

a liquid distribution system located above said body of fill material for distributing liquid on top of said body of fill material so that said liquid gravitates downward through said body of fill material;

a fan located below said body of fill material for blowing cooling air upward through said body of fill material to contact and cool said liquid; and a dual-layer drainage collection system located between said body of fill material and said fan for collecting said liquid falling from said body of fill material and for preventing said liquid from reaching said fan, said drainage collection system including;

an upper layer of parallel elongated collection plates having a first length, said collection plates being sloped and overlapping in a direction transverse to said first length of said collection plates, said overlapping collection plates covering said fan;

a lower layer of parallel elongated collection plates located between said upper layer and said fan for collecting overspray from said upper layer and preventing said overspray from reaching said fan, said collection plates of said lower layer having a second length oriented substantially parallel to said first length of said collection plates of said upper layer, wherein said collection plates of said lower layer are sloped oppositely from said collection plates of said upper layer.

2. The apparatus of claim 1, wherein:

a lower edge of each of said collection plates of said upper layer coincides with an upper edge of each of said collection plates of said lower level so that said upper and lower layers form a herringbone-shaped pattern.

3. The apparatus of claim 2, wherein:

said dual-layer drainage collection system is constructed from a plurality of herringbone-shaped segments, each of which includes one collection plate of said upper layer and one collection plate of said lower layer and frame means for providing a detachable push fit assembly between adjacent ones of said herringbone-shaped segments.

4. The apparatus of claim 1 wherein:

each of said collection plates of said upper layer includes a plurality of upwardly extending ribs running along its length at spaced locations across its width thereby defining a plurality of parallel channels for collecting liquids;

each of said collection plates of said lower layer includes a plurality of upwardly extending ribs running along its length at spaced locations across its width thereby defining a plurality of parallel channels for collecting said overspray from said upper layer; and said ribs of said collection plates of said lower layer having a substantially shorter vertical height than said ribs of said collection plates of said upper layer thereby providing said lower layer with both a lesser liquid collection capacity and a lesser air flow resistance than said upper layer.

5. The apparatus of claim 1, wherein:

each of said collection plates of said upper layer includes a plurality of upwardly extending ribs running along its length at spaced locations across its width thereby defining a plurality of parallel channels for collecting liquids.

6. The apparatus of claim 1, further comprising:

a basin laterally surrounding said fan, said basin including first and second parallel gutter means, on opposite sides of said fan, for receiving liquid from said drainage collection system and for directing said liquid into said basin; and said lengths of said collection plates lying generally perpendicular to said first and second gutter means of said basin, with ends of said collection plates being open to drain into said first and second gutter means.

7. The apparatus of claim 6, wherein:

each of said first and second gutter means includes an upper gutter and a lower gutter, said upper gutters being spaced further apart than are said lower gutters;

said first length of said collection plates of said upper layer is greater than a length of said collection plates of said lower layer; and said upper and lower layers of collection plates span between said upper and lower gutters, respectively.

8. The apparatus of claim 6, wherein:

said basin is a generally rectangular basin;

said apparatus further includes four walls extending upward from said basin and containing said body of fill material, said collection plates lying substantially parallel to a first pair of said walls; and air flow spaces are defined between said first pair of walls and said drainage collection system.

9. A transportable cooling tower module, comprising:

a basin;

four walls extending vertically upward from said basin;

an air supply duct having an air intake opening defined in a bottom thereof and an air discharge outlet defined in a top thereof, said air supply duct being laterally surrounded by said basin;

a vertical axis fan located in said air supply duct;

a drainage collection system located above said basin and said air supply duct, said drainage collection system including first and second layers of drainage collection plates, each of said layers including a plurality of parallel elongated collection plates having a length, said collection plates being sloped and overlapping in a direction transverse to said length, said overlapping collection plates covering said fan and draining into said basin;

a body of fill material located directly above said drainage collection system, said body of fill material having a vertical thickness of at least approximately five feet;

a liquid distribution system including at least one nozzle spaced above said body of fill material so as to have a free-fall height of spray from said nozzle to said fill material of less than one foot;

a drift eliminator located above said liquid distribution system; and said transportable cooling tower module having an overall height from a bottom of said basin to a top of said walls of no greater than eleven feet; wherein said basin includes at least four beams, at least two of which each include an upper gutter and a lower gutter draining into said basin;

said first layer of drainage collection plates is at least partially supported by and drains into said upper gutters; and said second layer of drainage collection plates is at least partially supported by and drains into said lower gutters;

said body of fill material is supported upon said first layer of drainage collection plates.

10. A cooling tower, comprising:

a combined basin and supporting frame assembly including four hollow outer beams, said outer beams being structurally connected together at their ends to form a four-sided rectangular supporting frame, said outer beams each having an enclosed interior, said interiors being communicated together to define a basin for collecting liquid, at least one basin inlet defined in said supporting frame assembly, said outer beams defining a generally rectangular plenum space laterally surrounded by said four outer beams;

four walls extending vertically upward from and supported from said four outer beams;

a first air supply duct extending upward into said plenum space, said first air supply duct having an air intake opening defined in a bottom thereof and an air discharge outlet opening into said plenum space;

a first vertical axis fan located in said first air supply duct;

a drainage collection system supported on said supporting frame assembly above said plenum space, said drainage collection system including at least a first layer having a plurality of parallel elongated collection plates having a length, said collection plates being sloped and overlapping in a direction transverse to said length of said collection plates, said drainage collection plates draining through said at least one basin inlet into said basin;

a body of fill material located directly above said drainage collection system and within said four walls; and a liquid distribution system located above said body of fill material.

11. The cooling tower of claim 10, wherein:

each of said four hollow outer beams is a pultruded fiberglass member having a substantially uniform cross-sectional shape along its length.

12. The cooling tower of claim 11, wherein:

each of said four hollow outer beams is substantially identical in cross-sectional shape to the others of said four hollow beams.

13. The cooling tower of claim 11, wherein:

each of said four walls includes an intermediate pultruded fiberglass wall panel having a first tongue and groove connection to its respective hollow outer beam, and an upper pultruded fiberglass wall panel having a second tongue and groove connection to said intermediate wall panel.

14. The cooling tower of claim 10, wherein:

at least one of said outer beams includes an upwardly open gutter defined on top of said beam, said gutter being communicated with said basin through said basin inlet; and said drainage collection system rests on top of said gutter and drains into said gutter.

15. The cooling tower of claim 10, further comprising:

a fifth hollow intermediate beam spanning between intermediate points of a first two of said four outer beams and oriented generally parallel to the other two of said four outer beams, said fifth hollow intermediate beam having an enclosed interior communicated with the interiors of said first two of said four outer beams and defining a part of said basin.

16. The cooling tower of claim 15, further comprising:

a basin outlet opening defined in said fifth hollow intermediate beam for draining said basin.

17. The cooling tower of claim 15, wherein:

said fifth hollow intermediate beam divides said plenum space into first and second generally rectangular plenum space portions;

said first air supply duct being located in said first plenum space portion; and said cooling tower further including a second air supply duct located in said first plenum space portion and third and fourth air supply ducts located in said second plenum space portion; and second, third and fourth vertical axis fans located in said second, third and fourth air supply ducts.

18. The cooling tower of claim 10, wherein:

said first air supply duct extends only partially into said plenum space.

19. The cooling tower of claim 18, wherein:

said first air supply duct extends a first distance into said plenum space no greater than one-half a second distance from said air intake opening to said drainage collection plates so that upwardly flowing air from said fan is forced through said body of fill material at a more uniform density than it would if said air supply duct extended substantially the entirety of said second distance.

* * * * *